US009280351B2

(12) United States Patent
Bonanno et al.

(10) Patent No.: US 9,280,351 B2
(45) Date of Patent: Mar. 8, 2016

(54) SECOND-LEVEL BRANCH TARGET BUFFER BULK TRANSFER FILTERING

(75) Inventors: James J. Bonanno, Wappingers Falls, NY (US); Ulrich Mayer, Weil im Schoenbuch (DE); Brian R. Prasky, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 13/524,306

(22) Filed: Jun. 15, 2012

(65) Prior Publication Data
US 2013/0339693 A1 Dec. 19, 2013

(51) Int. Cl.
*G06F 9/38* (2006.01)
*G06F 9/30* (2006.01)

(52) U.S. Cl.
CPC .......... *G06F 9/3806* (2013.01); *G06F 9/30047* (2013.01)

(58) Field of Classification Search
CPC ............ G06F 12/0811; G06F 12/0862; G06F 12/0897; G06F 12/08; G06F 12/08748; G06F 9/3804; G06F 2212/6028
USPC .......... 711/118, 119, 122, 125, 129; 712/205, 712/207, 229, 238
See application file for complete search history.

(56) References Cited

U.S. PATENT DOCUMENTS

| 5,163,140 | A | 11/1992 | Stiles et al. |
| 5,574,871 | A | 11/1996 | Hoyt et al. |
| 6,154,833 | A | 11/2000 | Murty et al. |
| 6,247,122 | B1 | 6/2001 | Henry et al. |
| 6,332,190 | B1 | 12/2001 | Hara |
| 6,539,458 | B2 | 3/2003 | Holmberg |
| 6,553,488 | B2 | 4/2003 | Yeh et al. |
| 6,560,693 | B1 * | 5/2003 | Puzak et al. ................... 712/207 |
| 6,601,161 | B2 | 7/2003 | Rappoport et al. |
| 7,024,545 | B1 | 4/2006 | Zuraski, Jr. et al. |
| 7,082,520 | B2 | 7/2006 | Bonanno et al. |
| 7,120,784 | B2 | 10/2006 | Alexander et al. |
| 7,278,012 | B2 | 10/2007 | Sartorius et al. |
| 7,493,480 | B2 | 2/2009 | Emma et al. |

(Continued)

OTHER PUBLICATIONS

IBM TBD (Mar. 2004). Pre-thread Valid Bits for Multi-threaded Effective to Real Address Translation (ERATs). IPCOM000022179D.

(Continued)

*Primary Examiner* — Andrew Caldwell
*Assistant Examiner* — Michael Metzger
(74) *Attorney, Agent, or Firm* — Cantor Colburn LLP; Margaret McNamara

(57) ABSTRACT

Embodiments relate to second-level branch target buffer bulk transfer filtering. An aspect includes a system for second-level branch target buffer bulk transfer filtering. The system includes a first-level branch target buffer and a second-level branch target buffer coupled to a processing circuit. The processing circuit is configured to perform a method. The method includes receiving branch target buffer miss indicators, receiving instruction cache miss indicators, and recording information about the branch target buffer miss indicators and the instruction cache miss indicators in search trackers. Based on detecting, by the processing circuit, a search tracker representing a correlated pair of the branch target buffer miss indicators and the instruction cache miss indicators, the search tracker is activated by the processing circuit to perform a bulk transfer from the second-level branch target buffer to the first-level branch target buffer.

14 Claims, 8 Drawing Sheets

(56) References Cited

U.S. PATENT DOCUMENTS

| | | | |
|---|---|---|---|
| 7,533,252 B2 | 5/2009 | Davis et al. | |
| 7,657,726 B2 | 2/2010 | Emma et al. | |
| 7,783,870 B2* | 8/2010 | Levitan et al. | 712/238 |
| 7,831,817 B2 | 11/2010 | Biles | |
| 8,166,345 B2 | 4/2012 | Abou-Emara et al. | |
| 2004/0015683 A1* | 1/2004 | Emma et al. | 712/240 |
| 2008/0120496 A1 | 5/2008 | Bradford et al. | |
| 2009/0217017 A1 | 8/2009 | Alexander et al. | |
| 2010/0017586 A1 | 1/2010 | Gelman et al. | |
| 2010/0058038 A1 | 3/2010 | Wang | |
| 2011/0153945 A1 | 6/2011 | Kim et al. | |
| 2012/0042155 A1 | 2/2012 | Rychlik | |
| 2013/0339695 A1 | 12/2013 | Bonanno et al. | |
| 2014/0019738 A1 | 1/2014 | Kataoka et al. | |

OTHER PUBLICATIONS (Sep. 2005) Method for Increasing Target Density in a BTB. IPCOM000128938D.

Gonclaves, et al, "Evaluating the effects of branch prediction accuracy on the performance of SMT architectures," Proceedings of Ninth Euromicro Workshop on Parallel and Distributed Processing, Feb. 2001, pp. 1-9.

Hily and Seznec, "Branch Prediction and Simultaneous Multithreading," Proceedings of the 1996 Conference on Parallel Architectures and Compilation Techniques, Mar. 1996, pp. 1-10.

A. Seznec, "The L-TAGE Branch predictor," Journal of Instruction Level Parallelism 9, May 2007, pp. 1-13.

Tullsen, et al, "Simultaneous Multithreading: Maximizing On-Chip Parallelism," Proceedings of the 22rd Annual International Symposium on Computer Architecture, Jun. 1995, pp. 1-12.

Lee, et al., Branch Prediction Strategies and Branch Target Buffer Design, Computer, Jan. 1984, 17 pages.

McFarling, Combining Branch Predictors, Technical Report TN-36m, Digital Western Research Laboratory, Jun. 1993, 29 pages.

Pan, et al., Correlation-Based Branch Target Buffer Design, http://www.ip.com/pubview/IPCOM000104329D, Mar. 19, 2005, 5 pages.

Jimenez, Delay-Sensitive Branch Predictors for Future Technologies, PhD Thesis, University of Texas at Austin, Jan. 2002, 165 pages.

Calder, et al., Next Cache Line and Set Prediction, Proceedings of 22nd Annual Intern'l Symposium on Computer Architecture, ACM, 1995, 10 pages.

Burcea, et al., Phantom-BTB: A Virtualized Branch Target Buffer Design, ASPLOS '09, Washington, DC, Mar. 7-11, 2009, 11 pages.

Anonymous, Power and Performance Improvements Using a Selective Branch Target Buffer Entry Replacement, http://www.ip.com/pubview/IPCOM146501D; Feb. 13, 2007, 4 pages.

\* cited by examiner

BTB1 Search Pipeline

| Cycle: | 0 | 1 | 2 | 3 | 4 | 5 |
|---|---|---|---|---|---|---|
| Restart or target redirect @ address 0x102 402 | BTB1 index | BTB1 access | BTB1 hit detect (miss) | | | |
| Sequential search @ address 0x120 404 | | BTB1 index | BTB1 access | BTB1 hit detect (miss) | | |
| Sequential search @ address 0x140 (3rd sequential search without hit: 3 x 32 Bytes = 96 Bytes searched without a hit) 406 | | | BTB1 index | BTB1 access | BTB1 hit detect (miss) | BTB1 miss indication for address 0x102 sent to BTB2 search trackers |

FIG. 4

208 → BTB2 Search Trackers

| Tracker # 502 | BTB1 miss valid 504 | BTB1 miss address 506 | Icache miss valid 508 | Icache miss address 510 | Other tracker state 512 |
|---|---|---|---|---|---|
| 0 | 1 | 0x102 | 1 | 0x102 | |
| 1 | 1 | 0x8200 | 0 | 0x6100 | |
| ... | ... | ... | ... | ... | ... |
| N-1 | 0 | 0x12450 | 0 | 0x12450 | |

FIG. 5

SECOND-LEVEL BRANCH TARGET BUFFER BULK TRANSFER FILTERING

BACKGROUND

The present invention relates generally to computer processing systems, and more specifically, to second-level branch target buffer bulk transfer filtering.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching a next instruction in an instruction fetching stage for the pipeline. A branch predictor may attempt to guess whether a conditional branch will be taken or not. A branch predictor may also include branch target prediction, which attempts to guess a target of a taken conditional or unconditional branch before it is computed by decoding and executing the instruction itself. A branch target may be a computed address based on an offset and/or an indirect reference through a register.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed in the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted.

SUMMARY

Exemplary embodiments include a system for second-level branch target buffer bulk transfer filtering. The system includes a first-level branch target buffer and a second-level branch target buffer coupled to a processing circuit. The processing circuit is configured to perform a method. The method includes receiving branch target buffer miss indicators, receiving instruction cache miss indicators, and recording information about the branch target buffer miss indicators and the instruction cache miss indicators in search trackers. Based on detecting, by the processing circuit, a search tracker representing a correlated pair of the branch target buffer miss indicators and the instruction cache miss indicators, the search tracker is activated by the processing circuit to perform a bulk transfer from the second-level branch target buffer to the first-level branch target buffer.

Further exemplary embodiments include a computer-implemented method for second-level branch target buffer bulk transfer filtering. The method includes receiving branch target buffer miss indicators, receiving instruction cache miss indicators, and recording information about the branch target buffer miss indicators and the instruction cache miss indicators in search trackers. Based on detecting, by a processing circuit, a search tracker representing a correlated pair of the branch target buffer miss indicators and the instruction cache miss indicators, the search tracker is activated by the processing circuit to perform a bulk transfer from a second-level branch target buffer to a first-level branch target buffer.

Additional exemplary embodiments include a computer program product for second-level branch target buffer bulk transfer filtering. The computer program product includes a tangible storage medium readable by a processing circuit and storing instructions for execution by the processing circuit for performing a method. The method includes receiving branch target buffer miss indicators, receiving instruction cache miss indicators, and recording information about the branch target buffer miss indicators and the instruction cache miss indicators in search trackers. Based on detecting, by the processing circuit, a search tracker representing a correlated pair of the branch target buffer miss indicators and the instruction cache miss indicators, the search tracker is activated by the processing circuit to perform a bulk transfer from a second-level branch target buffer to a first-level branch target buffer.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

FIG. 4 depicts an example of a BTB1 search pipeline;

FIG. 5 depicts an example of BTB2 search trackers;

DETAILED DESCRIPTION

Figure 1:
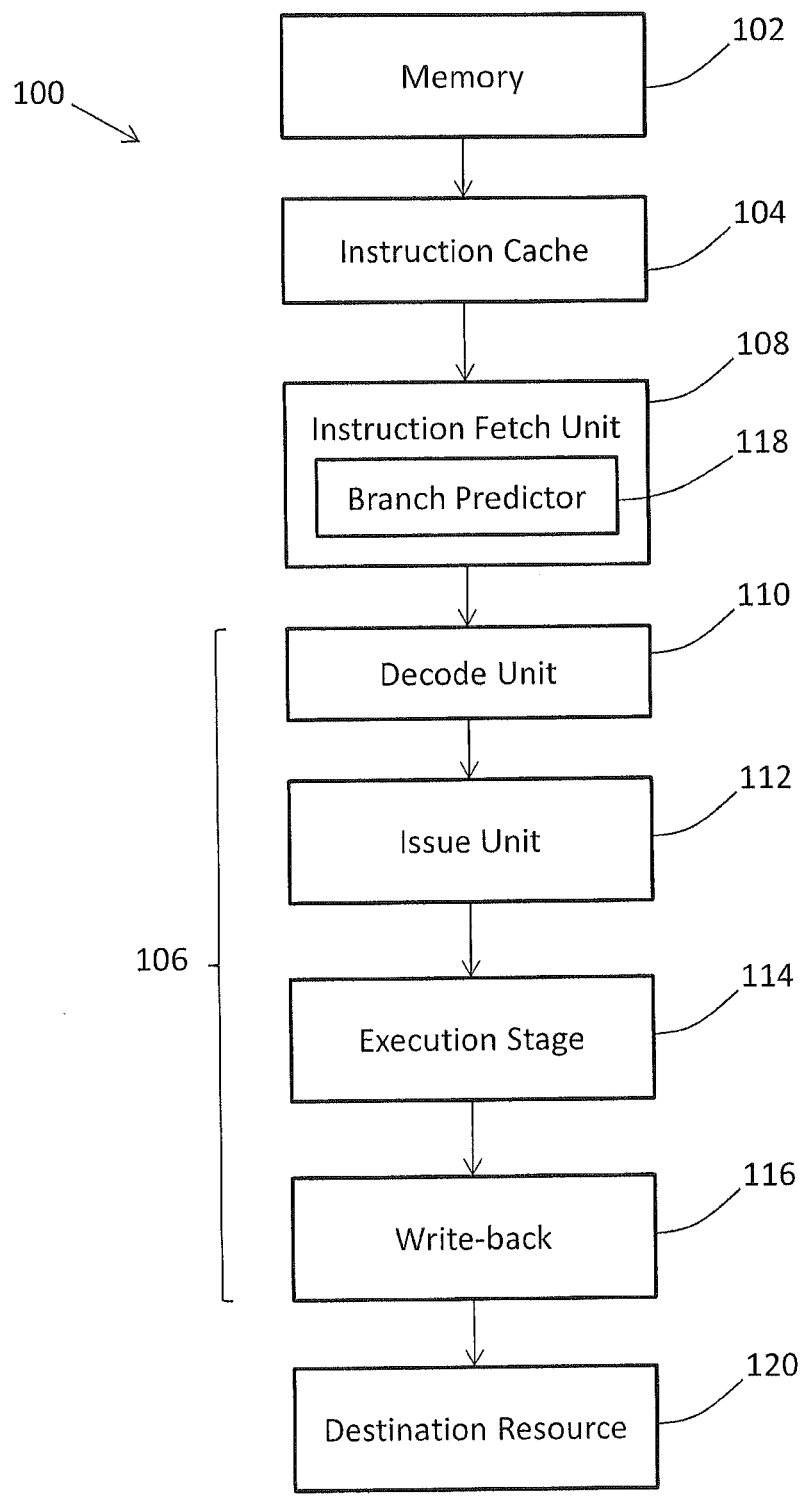
FIG. 1 depicts a processing system according to an embodiment.

Exemplary embodiments provide second-level branch target buffer bulk transfer filtering. A branch predictor can include a branch target buffer (BTB) structure and a number of structures and buffers to support branch prediction and branch target prediction. The BTB can be searched in parallel to and independently from instruction fetching to find upcoming branches, in which case it is called lookahead branch prediction. Alternatively, it can be accessed simultaneously with or after fetching instructions and determining instruction boundaries in order to provide a prediction for each encountered branch instruction, in which case it is called synchronous branch prediction. In either case performance benefits of the BTB are a function of the accuracy of the prediction provided from the BTB and the latency between the taken branch and the taken branch's target instruction in the pipeline.

A BTB structure can include multiple levels, such as a first level BTB (BTB1) and a slower but larger second-level BTB (BTB2). The BTB2 can be larger (and potentially slower) than the BTB1. Two level BTBs typically support parallel lookups such that synchronous accesses of the first and second-level can be made to determine if BTB2 was successful in locating a matching entry if BTB1 was unsuccessful. When complex software applications switch between multiple modules, for example modules A, B, and C, BTB1 may hold branch predictions for a currently executing module (module A in this example) while the larger BTB2 holds branch predictions for all modules (A, B, C). When switching between modules, such as from module A to module B, BTB1 will experience a number of misses, which could result in repeatedly making a number of higher latency lookups for all predictions from BTB2.

In exemplary embodiments, BTB2 operates asynchronously relative to BTB1 as a lookahead buffer. The BTB1 search operates either asynchronously to instruction fetching as a lookahead branch predictor or in parallel with instruction fetching prior to instruction decoding. The capacity of the BTB1 is designed to cover an instruction footprint larger than or equal to the level 1 instruction cache. When active, logic searches the BTB2 for branch prediction information related to a memory region, e.g., one 4 kilobyte (KB) page, and transfers all matching predictions into the BTB1. BTB2 search logic may be triggered when the BTB1 search process encounters a pattern of no prediction in the BTB1 and a correlated instruction cache miss is also detected. In embodiments, the logic detects that the BTB1 may be lacking predictions and speculatively transfers branch prediction information from the BTB2 into the BTB1 for the memory region that the branch prediction is currently operating upon rather than performing a lookup of the BTB2 to directly make branch predictions. Embodiments attempt to distinguish true BTB1 misses where branches exist in the instruction stream but have been replaced in the BTB1 from cases where there are no branches present in a particular part of the instruction stream. Because the BTB1 is being searched asynchronously from or prior to instruction decode, at the time of such searching it is not known whether or not there are actually branch instructions at the addresses being searched. A BTB1 miss is defined as not finding any branch predictions in the BTB1 in some amount of sequential searching, e.g., 3 searches covering a maximum of 96 Bytes of instruction space. By only triggering a full BTB2 bulk transfer for BTB1 misses that also had a corresponding instruction cache miss in the proximity of the BTB1 starting search address associated with the BTB1 miss (the miss address), unnecessary BTB2 searches and bulk transfers can be avoided. Avoiding unnecessary searches and transfers may result in reduced power consumption and reduces the risk of overwriting values in the BTB1 with potentially less useful data from the BTB2. This filtering mechanism is effective because the footprint of the BTB1 is larger than or equal to the footprint of the level 1 instruction cache. Therefore, typically if there is a miss for a particular address in the BTB1 because of limited BTB1 capacity, there is also a miss for that address (or nearby addresses) in the instruction cache.

FIG. 1 depicts a block diagram of a processing system 100 according to an embodiment. The processing system 100 includes a memory 102, an instruction cache 104, an instruction fetch unit 108, a branch predictor 118, and a processing pipeline 106. The processing system 100 may be included within a computer processor or otherwise distributed within a computer system. Instructions and data can be stored in memory 102, and the instruction cache 104 may access instructions in memory 102 and store the instructions to be fetched. The memory 102 may include any type of volatile or non-volatile memory, such as cache memory. The memory 102 and instruction cache 104 can include multiple cache levels. A data cache (not depicted) may also be included in the processing system 100.

In FIG. 1, a simplified example of the instruction fetch unit 108 and the processing pipeline 106 are depicted. The processing system 100 can further include multiple processing pipelines 106 and instruction fetch units 108. The processing pipeline 106 includes a decode unit 110, an issue unit 112, an execution stage 114, and write-back logic 116. The entire instruction fetch unit 108 or the branch predictor 118 may also be part of the processing pipeline 106. The processing pipeline 106 can include other features, such as error checking and handling logic, one or more parallel paths through the processing pipeline 106, and other features known in the art. While a forward path through the processing system 100 is depicted in FIG. 1, other feedback and signaling paths may be included between elements of the processing system 100.

The instruction fetch unit 108 fetches instructions from the instruction cache 104 for further processing by the decode unit 110. In an exemplary embodiment, the instruction fetch unit 108 includes the branch predictor 118. Alternatively, the branch predictor 118 may be located separately from the instruction fetch unit 108. The instruction fetch unit 108 can also include other branch prediction logic (not depicted). The branch predictor 118 is an example of a processing circuit to implement second-level branch target buffer bulk transfer filtering.

The decode unit 110 decodes instructions and passes the decoded instructions, portions of instructions, or other decoded data to the issue unit 112. The issue unit 112 analyzes the instructions or other data and transmits the decoded instructions, portions of instructions, or other data to one or more execution units in the execution stage 114 based on the analysis. The execution stage 114 executes the instructions. The execution stage 114 may include a plurality of execution units, such as fixed-point execution units, floating-point execution units, load/store execution units, and vector execution units. The write-back logic 116 writes results of instruction execution back to a destination resource 120. The destination resource 120 may be any type of resource, including registers, cache memory, other memory, I/O circuitry to communicate with other devices, other processing circuits, or any other type of destination for executed instructions or data.

Figure 2:
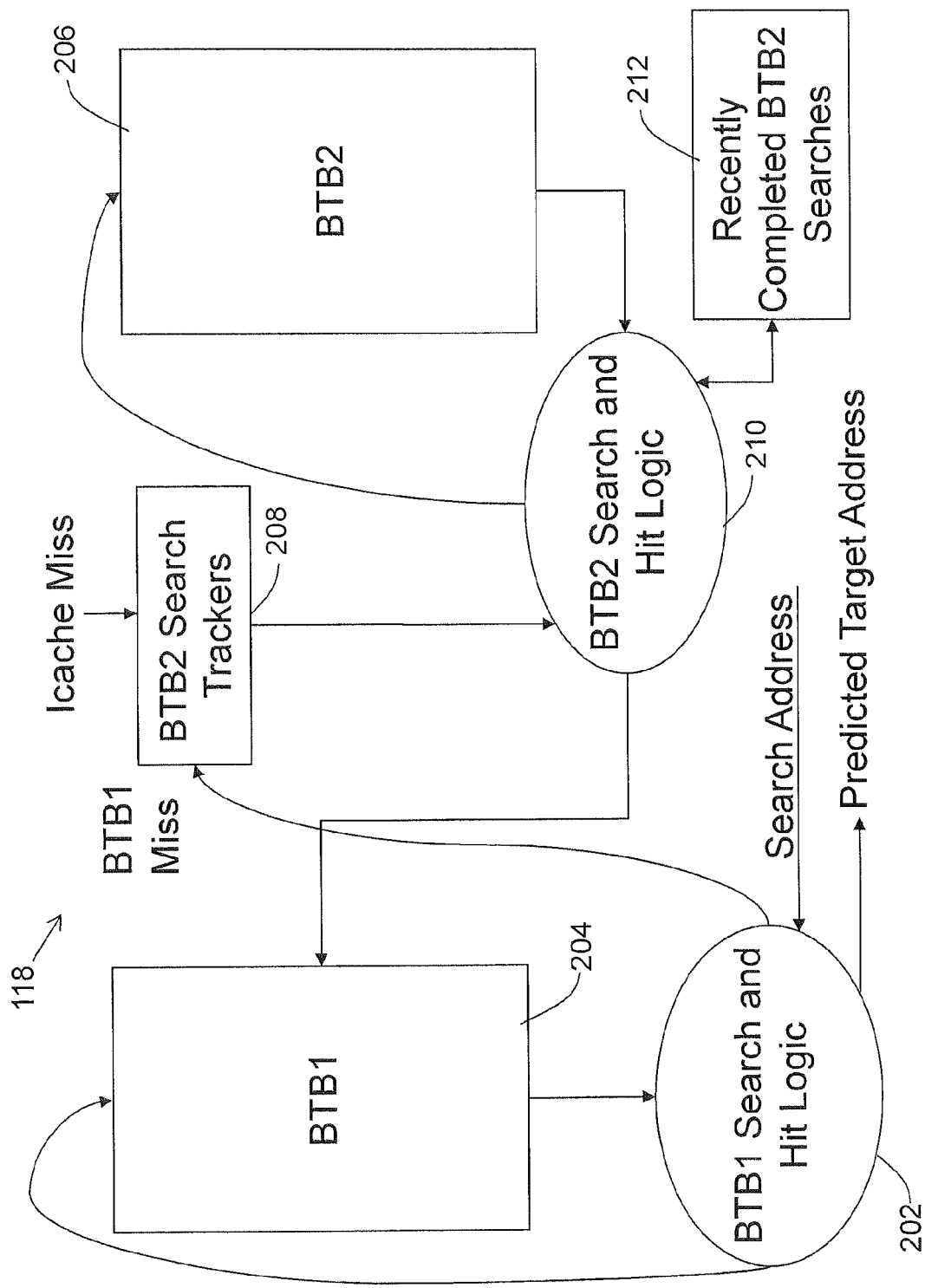
FIG. 2 depicts a branch predictor according to an embodiment.

FIG. 2 depicts an example of the branch predictor 118 of FIG. 1 in greater detail. The example branch predictor 118 of FIG. 2 includes BTB1 search and hit logic 202, BTB1 204, BTB2 206, BTB2 search trackers 208, BTB2 search and hit logic 210, and a recently completed BTB2 search queue 212. The BTB1 search and hit logic 202 controls access and updates of BTB entries in the BTB1 204, while the BTB2 search and hit logic 210 controls access and updates of BTB entries in the BTB2 206. In an exemplary embodiment, BTB1 204 is a primary or first-level BTB and BTB2 206 is a secondary or second-level BTB. BTB2 search trackers 208 are configured as a filter for searching and controlling the bulk transfer of BTB entries from the BTB2 206 based on a combination of a BTB1 miss and an instruction cache miss associated with a same region of memory. The recently completed BTB2 search queue 212 holds a list of recently completed searches of the BTB2 206, and may be used to prevent creating new search tracker entries in the BTB2 search trackers 208 matching a recently completed search. While the BTB1 search and hit logic 202 and the BTB2 search and hit logic 210 are depicted separately, it will be understood that they can be combined into a single logic block or further subdivided.

Figure 3:
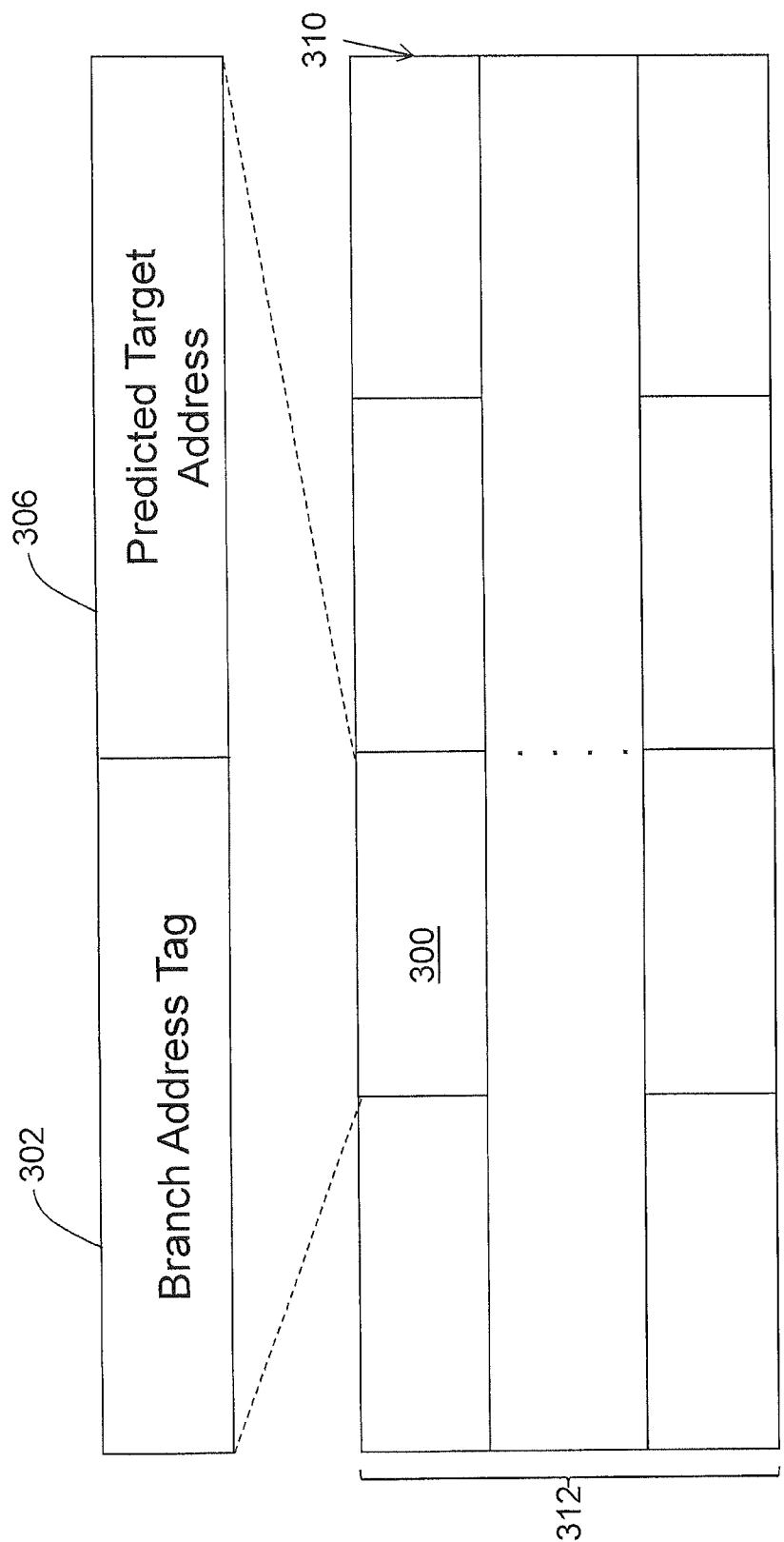
FIG. 3 depicts a branch target buffer entry according to an embodiment.

Each of the BTB1 204 and BTB2 206 is set associative, including multiple sets of BTB entries. The BTB2 206 is a higher level cache of branch prediction information. The capacity of the BTB2 206 is greater than the capacity of the BTB1 204 to store entries, and the BTB1 204 covers a larger or equal to instruction footprint than the instruction cache 104 of FIG. 1. A generic example of a BTB entry is depicted in FIG. 3 as BTB entry 300 (also referred to as entry 300), which includes a branch address tag 302 and a predicted target address 306. With continued reference to FIGS. 1-3, the branch address tag 302 is used to locate an entry within a BTB row 310, where each of the BTB1 204 and BTB2 206, of FIG. 2 can include multiple BTB rows 312 and multiple set associative BTB entries per BTB row 310. The BTB1 204 and BTB2 206 can have different numbers of BTB rows 312 and columns relative to each other. Each BTB entry 300 can include other branch prediction information (not depicted), such as a branch direction to indicate whether the associated branch was taken or not taken.

In an exemplary embodiment, a search address corresponding to a restart of the instruction fetch unit 108 is sent to the BTB1 search and hit logic 202 which thereafter operates asynchronously from instruction fetching until the next restart. When looking for branch predictions, the BTB1 204 is read and can provide a branch prediction if it contains an entry with a branch address tag 302 matching the search address. The BTB1 204 provides input to BTB1 search and hit logic 202 to determine whether a match or "hit" is located based on the search address. If a match is found, the BTB1 search and hit logic 202 outputs a predicted target address. If a match is not found, sequential searching of the BTB1 204 continues over a predetermined amount of address space before declaring a BTB1 miss and taking further action through BTB2 search trackers 208. An example sequence of a BTB1 search pipeline is depicted in FIG. 4.

The example of FIG. 4 depicts a sequence through 6 cycles of a BTB1 pipeline with a length of 3 operations as part of the BTB1 search and hit logic 202 of FIG. 2. In this example the BTB1 204 has a line size of 32 bytes. Therefore each BTB1 search covers 32 bytes of address space. An initial BTB1 search begins at row 402, where a restart or target redirect sets a search address of 0x102 (hexadecimal). In cycle 0 of row 402, a BTB1 index into BTB1 204 is determined. In cycle 1 of row 402, an access of the BTB1 204 is made. In cycle 2 of row 402, the BTB1 search and hit logic 202 determines whether a hit or miss was detected.

At row 404, the search of BTB1 204 advances sequentially to address 0x120 (hexadecimal). In cycle 1, while an access of the BTB1 204 is being made in row 402, a BTB1 index into BTB1 204 is determined in row 404. In cycle 2 of row 404, an access of the BTB1 204 is made. In cycle 3 of row 404, the BTB1 search and hit logic 202 determines whether a hit or miss was detected.

At row 406, the search of BTB1 204 advances sequentially to address 0x140 (hexadecimal). In cycle 2, while the BTB1 search and hit logic 202 determines whether a hit or miss was detected in row 402 and an access of the BTB1 204 is made in row 404, a BTB1 index into BTB1 204 is determined in row 406. In cycle 3 of row 406, an access of the BTB1 204 is made. In cycle 4 of row 406 the BTB1 search and hit logic 202 determines whether a hit or miss was detected. In this example, after 3 searches covering 96 bytes of searching without a hit, in cycle 5 of row 406 the BTB1 search and hit logic 202 reports a BTB1 miss to the BTB2 search trackers 208 of FIG. 2.

FIG. 5 depicts an example of BTB2 search trackers 208 of FIG. 2. The example of FIG. 5 includes tracker number column 502, BTB1 miss validity indicator column 504, BTB1 miss address column 506, instruction cache miss validity indicator column 508, instruction cache miss address column 510, and other tracker state column 512 which can hold additional information. Each row of the BTB2 search trackers 208 represents a search tracker entry.

Upon detecting a BTB1 miss that is not a duplicate of a recent miss and not a duplicate of one already in progress, the BTB1 miss address activates a BTB2 search tracker in the BTB2 search trackers 208. The recently completed BTB2 search queue 212 of FIG. 2 can be checked to determine whether the BTB1 miss is a duplicate of a recent miss. A search tracker stores the BTB1 miss address in the BTB1 miss address column 506, which is the starting instruction address that was being searched in the BTB1 204 by the BTB1 search and hit logic 202 that led to the detection of the BTB1 miss. An indication that a BTB1 miss was detected is stored by setting a BTB1 miss validity indicator in the BTB1 miss validity indicator column 504 (e.g., set associated bit to '1').

BTB1 misses may be tracked on the granularity of BTB2 pages. For example, if the BTB2 bulk transfer granularity (page size) is 4 KB, then any BTB1 miss in the same 4 KB page is considered the same page miss. If a search tracker is active for a BTB1 miss in a particular page, any subsequent misses in that same page are ignored while that search tracker is active and while that page address is in the recently completed BTB2 search queue 212 of FIG. 2. Upon detecting a BTB1 miss that is a duplicate of an active search tracker that has an instruction cache miss validity indicator of valid (e.g., bit set to '1'), but the BTB1 miss validity indicator is invalid (e.g., bit set to '0'), then the associated BTB1 miss validity indicator of the search tracker is set to valid (e.g., '1').

Independently from BTB1 misses, as instruction cache misses occur at the instruction cache 104 of FIG. 1, they are sent to the BTB2 search trackers 208. Each search tracker also tracks instruction cache misses. Instruction cache misses can be tracked on the same page granularity as BTB2 bulk transfers, or a different instruction cache granularity. For simplicity, the example assumes that instruction cache misses are tracked on the same page granularity as BTB2 bulk transfers. When an instruction cache miss occurs, a new search tracker is allocated if that miss is not a duplicate of an already—active tracker, and is not a duplicate of a recently completed BTB2 search based on the recently completed BTB2 search queue 212 of FIG. 2. If the instruction cache miss address matches the address of a tracker active for a BTB1 miss (a BTB1 miss address), but not an instruction cache miss, the instruction cache miss validity indicator is set valid (e.g., '1'). Search trackers here are shown unifying BTB1 miss and icache miss information as correlated pairs. An alternative embodiment may have separate tables of BTB1 miss trackers and icache miss trackers and compare them to detect matches as correlated pairs for determining how to control BTB2 searching.

Active search trackers are used to trigger searches of the BTB2 206. In exemplary embodiments, whenever a search tracker is active for both a BTB1 miss and an instruction cache miss, such as in tracker 0 of FIG. 5, a full page transfer occurs. All rows of the BTB2 206 within the page are searched, and hits are written into the BTB1 204. Search trackers that are active for both a BTB1 miss and instruction cache miss remain active until the BTB2 bulk transfer completes. Such a search tracker may not be allowed to be overwritten for any new incoming BTB1 or instruction cache misses. Upon completion, the BTB1 miss validity indicator and the instruction cache miss validity indictor can be set invalid, such as in tracker N-1 of FIG. 5, which makes the tracker available to be overwritten as a new tracker. Additionally, a record indicating completion can be added to the recently completed BTB2 search queue 212 of FIG. 2.

A search tracker that is active for a BTB1 miss but not active for an instruction cache miss, such as search tracker 1 in FIG. 5, does not trigger a complete BTB 2 bulk transfer for the entire page. It can either initiate BTB2 searches for a smaller granularity than the entire page, or does not initiate BTB2 searches at all. Such a search tracker may be a candidate for being overwritten by a new BTB1 or instruction cache miss. Alternatively, it can be prevented from being overwritten for a predetermined amount of time or until a condition is met. For example, it could be kept alive for an elapsed time based on a predetermined number of cycles. Alternatively, it could be kept alive until any to-be-initiated BTB2 searches are complete.

A search tracker that is active for an instruction cache miss, but not active for a BTB1 miss does not trigger any BTB2 searches at all. It is a candidate for being overwritten by a new BTB1 miss or instruction cache miss immediately. Alternatively, it can be prevented from being overwritten for a predetermined amount of time or until some condition is met.

Figure 6:
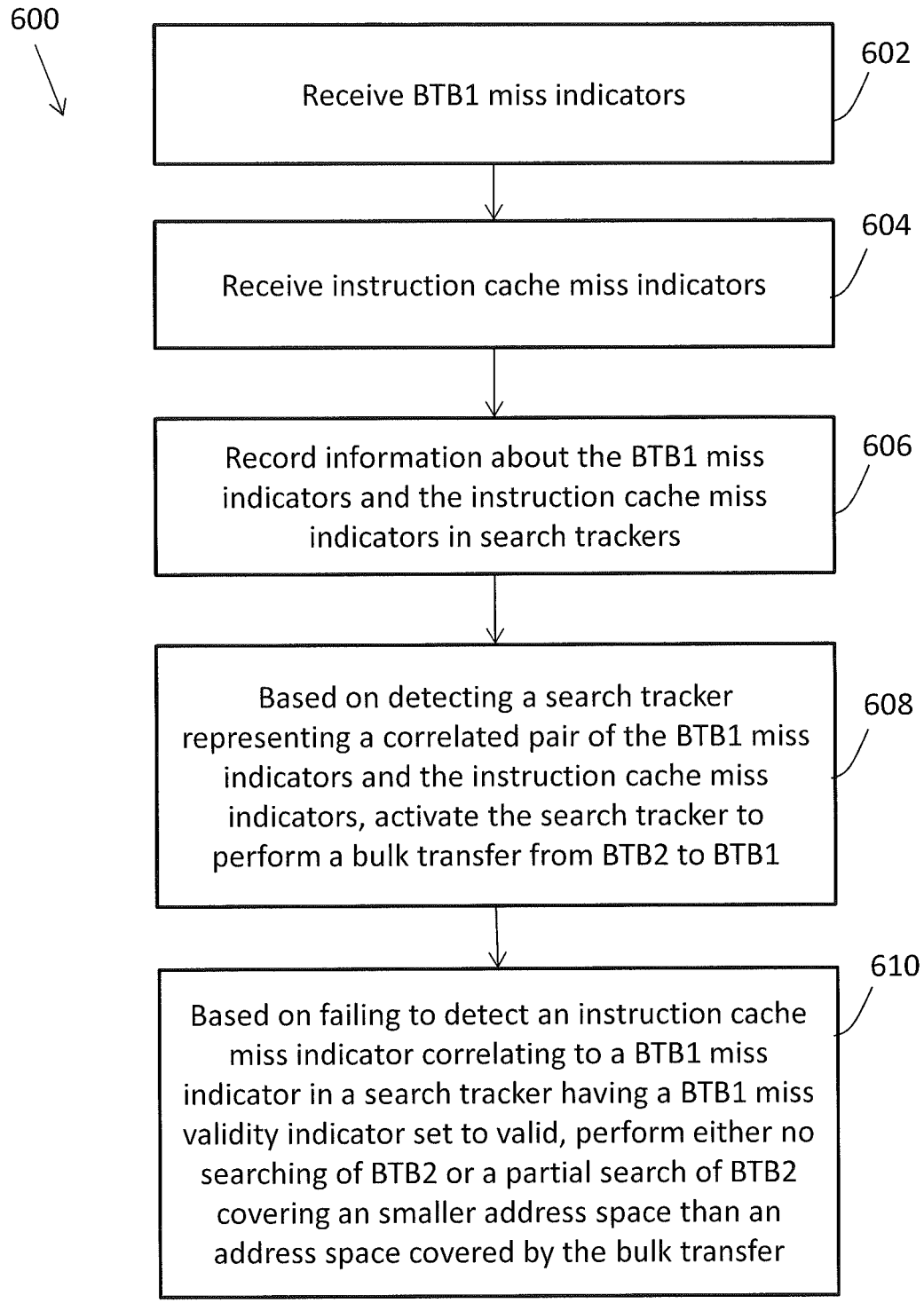
FIG. 6 is a flowchart illustrating a process for second-level branch target buffer bulk transfer filtering according to an embodiment.

Turning now to FIG. 6, a process 600 for second-level branch target buffer bulk transfer filtering will now be described in an exemplary embodiment. The process 600 is described in reference to FIGS. 1-5 and can be implemented by the branch predictor 118 of FIGS. 1 and 2.

The branch predictor 118 receives a search request to locate a branch prediction. The search request can include a search address that is passed to the BTB1 search and hit logic 202 and used to index into the BTB1 204. The BTB1 search and hit logic 202 searches for an entry corresponding to the search request in the BTB1 204. The search may be performed by passing a BTB row 310 of the BTB1 204, as indexed by the search address, to the BTB1 search and hit logic 202 to compare branch address tags 302 of BTB entries 300 relative to bits of the search address and identify a matching entry or a "hit". Alternatively, individual BTB entries 300 from the BTB1 204 can be passed to the BTB1 search and hit logic 202 for comparison. Hit results of the BTB1 search and hit logic 202 are used to output a predicted target address on a BTB1 hit and trigger action by the BTB2 search trackers 208 on a BTB1 miss. BTB1 miss indicators are sent to the BTB2 search trackers 208.

At block 602, BTB1 miss indicators are received at the BTB2 search trackers 208. At block 604, instruction cache miss indicators are received from the instruction cache 104 of FIG. 1 at the BTB2 search trackers 208. The BTB1 miss indicators and the instruction cache miss indicators are received asynchronously and can be received in parallel. At block 606, information about the BTB1 miss indicators and the instruction cache miss indicators is recorded in the BTB2 search trackers 208. The information can include address and validity information. At block 608, based on detecting a search tracker representing a correlated pair of the BTB1 miss indicators and the instruction cache miss indicators, the corresponding search tracker is activated to perform a bulk transfer from the BTB2 206 to the BTB1 204. At block 610, based on failing to detect, an instruction cache miss indicator correlating to a BTB1 miss indicator in a search tracker having a BTB1 miss validity indicator set to valid, either no searching of the BTB2 206 is performed or a partial search of the BTB2 206 is performed covering a smaller address space than an address space covered by the bulk transfer.

Based on failing to locate a matching entry in the BTB1 204 corresponding to the search request and receiving the instruction cache miss indicator as observed through the BTB2 search trackers 208, the BTB2 search and hit logic 210 initiates a secondary search to locate entries in the BTB2 206 having a memory region corresponding to the search request. Initiating the secondary search may be based on failing to locate the matching entry in the BTB1 204 over a predetermined amount of address space. For example, the BTB1 204 may be searched for the matching entry over a 96 byte address range, and upon failing to locate the matching entry within the 96 byte address range, entries from the BTB2 206 have a same page address (e.g., a 4 kilobyte page) are identified for searching and speculative transfer to the BTB1 204 when a valid instruction cache miss is also indicated. Initiation of secondary searches may also be subject to checking that no active search is already in progress for the same memory region or has recently completed.

To perform a bulk transfer, the BTB2 search and hit logic 210 can select a block of entries in the BTB2 206 to transfer. This can involve doing multiple accesses to read one or more rows from the BTB2 206, and finding matching entries based on tag compares between each access' BTB2 search address and the branch address tags in the BTB2 206. The block of entries selected can be based on a memory region corresponding to the search request, for example a 4 KB page. The BTB2 search trackers 208 are managed to control multiple bulk transfers from the BTB2 206 to the BTB1 204. When a BTB1 miss is received, the BTB2 search trackers 208 check to determine whether a valid search tracker entry exists for a BTB1 miss address in BTB1 miss address column 506 of FIG. 5 corresponding to the search request. If such a tracker already exists, either no action is taken in response to this new, duplicate, BTB1 miss, or alternatively some state in the existing matching tracker is updated. The BTB2 search trackers 208 determine whether a valid instruction cache miss address in the instruction cache miss address column 510 corresponding to the BTB1 miss address exists in a search tracker entry having a BTB1 miss validity indicator of invalid. Based on failing to locate the valid search tracker entry including the BTB1 miss address and failing to locate the valid instruction cache miss address corresponding to the BTB1 miss address, a new search tracker entry is created that includes the BTB1 miss address and sets the BTB1 miss validity indicator to valid. Based on failing to locate the valid search tracker entry including the BTB1 miss address and locating the search tracker entry having the instruction cache miss address corresponding to the BTB1 miss address and the BTB1 miss validity indicator of invalid, the BTB1 miss address is written to the search tracker entry and the BTB1 miss validity indicator is set to valid.

When an instruction cache miss indicator is received, the BTB2 search trackers 208 check to determine whether a valid search tracker entry exists for an instruction cache miss address in the instruction cache miss address column 510 of FIG. 5 corresponding to the instruction cache miss indicator. If such a tracker already exists, either no action is taken in response to this new, duplicate, icache miss, or alternatively some state in the existing matching tracker is updated. The BTB2 search trackers 208 determine whether a valid BTB1 miss address in BTB1 miss address column 506 corresponding to the instruction cache miss address exists in a search tracker entry having an instruction cache miss validity indicator of invalid. Based on failing to locate a valid search tracker entry including the instruction cache miss address and failing to locate a valid BTB1 miss address corresponding to the instruction cache miss address, a new search tracker entry is created that includes the instruction cache miss address and setting the instruction cache miss validity indicator to valid. Based on failing to locate a search tracker entry including the instruction cache miss address and locating the search tracker entry having the valid BTB1 miss address corresponding to the instruction cache miss address and the instruction cache miss validity indicator of invalid, the instruction cache miss address is written to the search tracker entry and the instruction cache miss validity indicator is set to valid.

The secondary search may be a search of less than the full memory page of the BTB2 206 based on the BTB1 miss validity indicator of valid and the instruction cache miss validity indicator of invalid in the search tracker entry associated with the search request. The smaller search of the BTB2 206 can be performed instead of the full memory page search.

Figure 7:
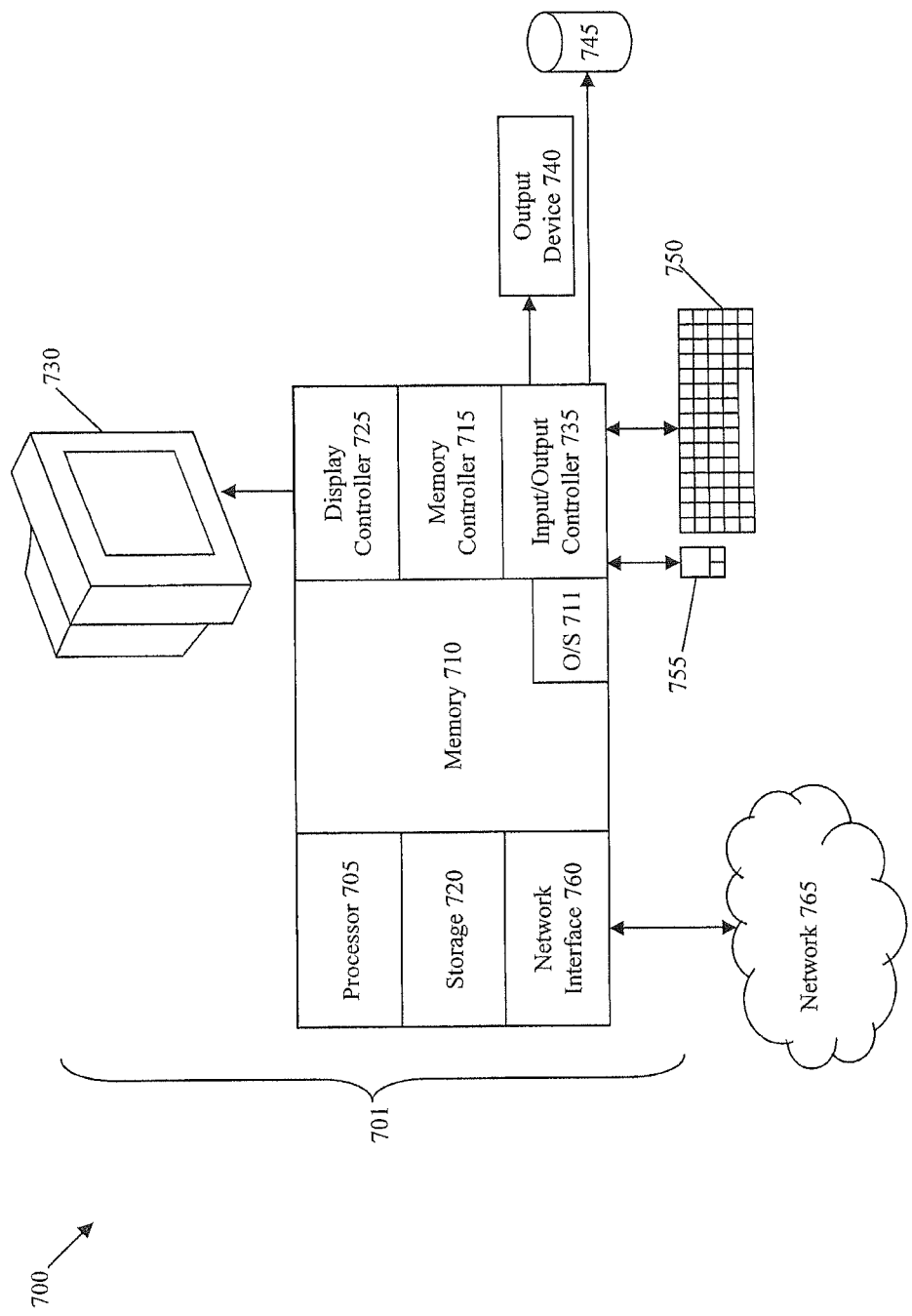
FIG. 7 depicts a computing system according to an embodiment.

FIG. 7 depicts a block diagram of a system 700 for second-level branch target buffer bulk transfer filtering in a processor 705. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 700 therefore includes general-purpose computer 701 as illustrated in FIG. 7.

In an exemplary embodiment, in terms of hardware architecture, as shown in FIG. 7, the computer 701 includes a processor 705 which is a processing circuit that includes the processing pipeline 106 of FIG. 1 and a branch predictor 118. The computer 701 further includes memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which includes an ordered listing of executable instructions for implementing logical functions. In the example of FIG. 7, the instructions in the memory 710 a suitable operating system (OS) 711. The operating system 711 essentially controls the execution of other computer programs and provides scheduling, input-output control, file and data management, memory management, and communication control and related services.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to fetch and execute instructions stored within the memory 710, to communicate data to and from the memory 710, and to generally control operations of the computer 701 pursuant to the instructions.

In an exemplary embodiment, where the branch predictor 118 of FIG. 2 is implemented in hardware, the methods described herein, such as process 600 of FIG. 6, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 8:
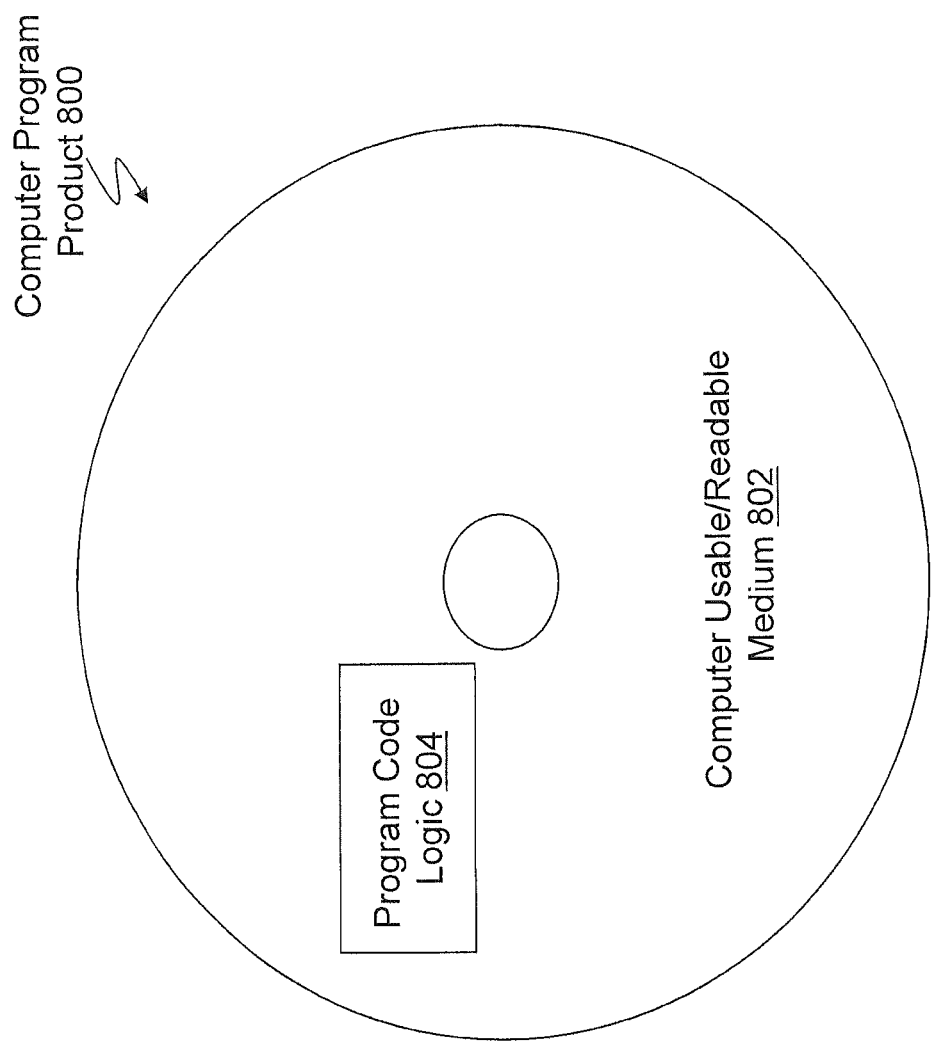
FIG. 8 depicts a computer-readable medium according to an embodiment.

Referring now to FIG. 8, in one example, a computer program product 800 includes, for instance, one or more storage media 802, wherein the media may be tangible and/or non-transitory, to store computer readable program code means or logic 804 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Embodiments include a system, method, and computer program product for second-level branch target buffer bulk transfer filtering. The system includes a first-level branch target buffer and a second-level branch target buffer coupled to a processing circuit. The processing circuit is configured to perform a method. The method includes receiving branch target buffer miss indicators, receiving instruction cache miss indicators, and recording information about the branch target buffer miss indicators and the instruction cache miss indicators in search trackers. Based on detecting, by the processing circuit, a search tracker representing a correlated pair of the branch target buffer miss indicators and the instruction cache miss indicators, the search tracker is activated by the processing circuit to perform a bulk transfer from the second-level branch target buffer to the first-level branch target buffer.

In an embodiment, the processing circuit of the system is further configured to perform no searching of the second-level branch target buffer based on failing to detect, by the processing circuit, an instruction cache miss indicator correlating to a branch target buffer miss indicator in a search tracker having a branch target buffer miss validity indicator set to valid.

In an embodiment, the processing circuit of the system is further configured to perform a partial search of the second-level branch target buffer covering a smaller address space than an address space covered by the bulk transfer based on failing to detect, by the processing circuit, an instruction cache miss indicator correlating to a branch target buffer miss indicator in a search tracker having a branch target buffer miss validity indicator set to valid.

In an embodiment, each of the branch target buffer miss indicators is received based on failing to locate a branch prediction in the first-level branch target buffer over a predetermined amount of address space.

In an embodiment, the processing circuit of the system is further configured to perform checking the search trackers to determine whether a valid search tracker entry exists for a branch target buffer miss address corresponding to a search request, and determining whether a valid instruction cache miss address corresponding to the branch target buffer miss address exists in a valid search tracker entry having a branch target buffer miss validity indicator of invalid. Based on failing to locate the valid search tracker entry including the branch target buffer miss address and failing to locate the valid instruction cache miss address corresponding to the branch target buffer miss address, a new search tracker entry is created including the branch target buffer miss address and the branch target buffer miss validity indicator is set to valid. Based on failing to locate the valid search tracker entry including the branch target buffer miss address and locating the valid search tracker entry having the valid instruction cache miss address corresponding to the branch target buffer miss address and the branch target buffer miss validity indicator of invalid, the branch target buffer miss address is written to the valid search tracker entry and the branch target buffer miss validity indicator is set to valid.

In an embodiment, the processing circuit of the system is further configured to perform checking the search trackers to determine whether a valid search tracker entry exists for an instruction cache miss address corresponding to one of the instruction cache miss indicators, and determining whether a valid branch target buffer miss address corresponding to the instruction cache miss address exists in a valid search tracker entry having an instruction cache miss validity indicator of invalid. Based on failing to locate the valid search tracker entry including the instruction cache miss address and failing to locate the valid branch target buffer miss address corresponding to the instruction cache miss address, a new search tracker entry is created including the instruction cache miss address and the instruction cache miss validity indicator is set to valid. Based on failing to locate the valid search tracker entry including the instruction cache miss address and locating the search tracker entry having the valid branch target buffer miss address corresponding to the instruction cache miss address and the instruction cache miss validity indicator of invalid, the instruction cache miss address is written to the valid search tracker entry and the instruction cache miss validity indicator is set to valid.

In an embodiment, the processing circuit of the system is further configured to perform updating of a recently completed second-level branch target buffer search queue based on completing a secondary search of the second-level branch target buffer, reading the recently completed second-level branch target buffer search queue, and preventing creation of a new search tracker entry based on identifying a matching recently completed second-level search in the recently completed second-level branch target buffer search queue.

In an embodiment, the processing circuit of the system is further configured to make a search tracker entry that is active for a branch target buffer miss but not active for an instruction cache miss available to be overwritten as a new search tracker based on one or more of: an elapsed time and completion of a to-be-initiated search of the second-level branch target buffer.

Technical effects and benefits include second-level branch target buffer bulk transfer filtering. Embodiments distinguish true level 1 BTB (BTB1) misses from cases where there are no branches present in a particular part of the instruction stream. By only triggering a full BTB2 bulk transfer for BTB1 misses that also had a corresponding instruction cache miss in the proximity of the BTB1 starting search address associated with the BTB1 miss (the miss address), unnecessary BTB2 searches and bulk transfers can be avoided. Power can also be saved by not searching the BTB2 when the search is less likely to be beneficial.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A system for second-level branch target buffer bulk transfer filtering, the system comprising:
   a first-level branch target buffer comprising multiple rows and multiple set associative entries per row;
   a second-level branch target buffer comprising multiple rows and multiple set associative entries per row; and
   a processing circuit coupled to the first-level branch target buffer and the second-level branch target buffer, the processing circuit configured to perform a method comprising:
      receiving branch target buffer miss indicators that are each set based on sequentially searching a plurality of entries across a plurality of rows of the first-level branch target buffer for a predetermined amount of address space without locating a matching entry;
      receiving instruction cache miss indicators;
      recording information about the branch target buffer miss indicators and the instruction cache miss indicators in search trackers that filter searching of the second-level branch target buffer and control bulk transfers from the second-level branch target buffer to the first-level branch target buffer, the search trackers each comprising a miss validity indicator column, an instruction cache miss validity indicator column, an instruction cache miss address column, and a first-level branch target buffer miss address column to store a starting instruction address that was being searched in the first-level branch target buffer that led to a branch target buffer miss;

based on detecting, by the processing circuit, a search tracker representing a correlated pair of the branch target buffer miss indicators and the instruction cache miss indicators, activating, by the processing circuit, the search tracker to perform a bulk transfer from the second-level branch target buffer to the first-level branch target buffer;

performing the bulk transfer of all entries in the second-level branch target buffer at a same page address as a starting search address associated with the branch target buffer miss of the first-level branch target buffer based on triggering by the search tracker, wherein the bulk transfer from second-level branch target buffer to the first-level branch target buffer is only triggered for an instance of the branch target buffer miss of the first-level branch target buffer that also has a corresponding instruction cache miss at the same page address as the starting search address associated with the branch target buffer miss of the first-level branch target buffer;

based on failing to detect, by the processing circuit, an instruction cache miss indicator correlating to a branch target buffer miss indicator in a search tracker having a branch target buffer miss validity indicator set to valid, performing one of: no searching of the second-level branch target buffer, and a partial search of the second-level branch target buffer covering a smaller address space than an address space covered by the bulk transfer;

updating a recently completed second-level branch target buffer search queue based on completing a secondary search of the second-level branch target buffer, the recently completed second-level branch target buffer search queue comprising a list of recently completed searches of the second-level branch target buffer;

reading the recently completed second-level branch target buffer search queue; and preventing creation of a new search tracker entry based on identifying a matching recently completed second-level search in the recently completed second-level branch target buffer search queue.

2. The system of claim 1, wherein each of the branch target buffer miss indicators is received based on failing to locate a branch prediction in the first-level branch target buffer over a predetermined amount of address space.

3. The system of claim 1, wherein the processing circuit is further configured to perform:

checking the search trackers to determine whether a valid search tracker entry exists for a branch target buffer miss address corresponding to a search request;

determining whether a valid instruction cache miss address corresponding to the branch target buffer miss address exists in a valid search tracker entry having a branch target buffer miss validity indicator of invalid;

based on failing to locate the valid search tracker entry comprising the branch target buffer miss address and failing to locate the valid instruction cache miss address corresponding to the branch target buffer miss address, creating a new search tracker entry comprising the branch target buffer miss address and setting the branch target buffer miss validity indicator to valid; and based on failing to locate the valid search tracker entry comprising the branch target buffer miss address and locating the valid search tracker entry having the valid instruction cache miss address corresponding to the branch target buffer miss address and the branch target buffer miss validity indicator of invalid, writing the branch target buffer miss address to the valid search tracker entry and setting the branch target buffer miss validity indicator to valid.

4. The system of claim 1, wherein the processing circuit is further configured to perform:

checking the search trackers to determine whether a valid search tracker entry exists for an instruction cache miss address corresponding to one of the instruction cache miss indicators;

determining whether a valid branch target buffer miss address corresponding to the instruction cache miss address exists in a valid search tracker entry having an instruction cache miss validity indicator of invalid;

based on failing to locate the valid search tracker entry comprising the instruction cache miss address and failing to locate the valid branch target buffer miss address corresponding to the instruction cache miss address, creating a new search tracker entry comprising the instruction cache miss address and setting the instruction cache miss validity indicator to valid; and based on failing to locate the valid search tracker entry comprising the instruction cache miss address and locating the valid search tracker entry having the valid branch target buffer miss address corresponding to the instruction cache miss address and the instruction cache miss validity indicator of invalid, writing the instruction cache miss address to the valid search tracker entry and setting the instruction cache miss validity indicator to valid.

5. The system of claim 1, wherein the processing circuit is further configured to perform:

making a search tracker entry that is active for a branch target buffer miss but not active for an instruction cache miss available to be overwritten as a new search tracker based on one or more of: an elapsed time and completion of a to-be-initiated search of the second-level branch target buffer.

6. A computer-implemented method for second-level branch target buffer bulk transfer filtering, the method comprising:

receiving branch target buffer miss indicators that are each set based on sequentially searching a plurality of entries across a plurality of rows of a first-level branch target buffer for a predetermined amount of address space without locating a matching entry, wherein the first-level branch target buffer comprises multiple rows and multiple set associative entries per row and a second-level branch target buffer comprises multiple rows and multiple set associative entries per row;

receiving instruction cache miss indicators;

recording information about the branch target buffer miss indicators and the instruction cache miss indicators in search trackers that filter searching of the second-level branch target buffer and control bulk transfers from the second-level branch target buffer to the first-level branch target buffer, the search trackers each comprising a miss validity indicator column, an instruction cache miss validity indicator column, an instruction cache miss address column, and a first-level branch target buffer miss address column to store a starting instruction address that was being searched in a first-level branch target buffer that led to a branch target buffer miss;

based on detecting, by a processing circuit, a search tracker representing a correlated pair of the branch target buffer miss indicators and the instruction cache miss indicators, activating, by the processing circuit, the search tracker to perform a bulk transfer from a second-level branch target buffer to the first-level branch target buffer;

performing the bulk transfer of all entries in the second-level branch target buffer at a same page address as a starting search address associated with the branch target buffer miss of the first-level branch target buffer based on triggering by the search tracker, wherein the bulk transfer from second-level branch target buffer to the first-level branch target buffer is only triggered for an instance of the branch target buffer miss of the first-level branch target buffer that also has a corresponding instruction cache miss at the same page address as the starting search address associated with the branch target buffer miss of the first-level branch target buffer;

based on failing to detect, by the processing circuit, an instruction cache miss indicator correlating to a branch target buffer miss indicator in a search tracker having a branch target buffer miss validity indicator set to valid, performing one of: no searching of the second-level branch target buffer, and a partial search of the second-level branch target buffer covering a smaller address space than an address space covered by the bulk transfer;

updating a recently completed second-level branch target buffer search queue based on completing a secondary search of the second-level branch target buffer, the recently completed second-level branch target buffer search queue comprising a list of recently completed searches of the second-level branch target buffer;

reading the recently completed second-level branch target buffer search queue; and preventing creation of a new search tracker entry based on identifying a matching recently completed second-level search in the recently completed second-level branch target buffer search queue.

7. The computer-implemented method of claim 6, wherein each of the branch target buffer miss indicators is received based on failing to locate a branch prediction in the branch target buffer over a predetermined amount of address space.

8. The computer-implemented method of claim 6, further comprising:

checking the search trackers to determine whether a valid search tracker entry exists for a branch target buffer miss address corresponding to a search request;

determining whether a valid instruction cache miss address corresponding to the branch target buffer miss address exists in a valid search tracker entry having a branch target buffer miss validity indicator of invalid;

based on failing to locate the valid search tracker entry comprising the branch target buffer miss address and failing to locate the valid instruction cache miss address corresponding to the branch target buffer miss address, creating a new search tracker entry comprising the branch target buffer miss address and setting the branch target buffer miss validity indicator to valid; and based on failing to locate the valid search tracker entry comprising the branch target buffer miss address and locating the valid search tracker entry having the valid instruction cache miss address corresponding to the branch target buffer miss address and the branch target buffer miss validity indicator of invalid, writing the branch target buffer miss address to the valid search tracker entry and setting the branch target buffer miss validity indicator to valid.

9. The computer-implemented method of claim 6, further comprising:

checking the search trackers to determine whether a valid search tracker entry exists for an instruction cache miss address corresponding to one of the instruction cache miss indicators;

determining whether a valid branch target buffer miss address corresponding to the instruction cache miss address exists in a valid search tracker entry having an instruction cache miss validity indicator of invalid;

based on failing to locate the valid search tracker entry comprising the instruction cache miss address and failing to locate the valid branch target buffer miss address corresponding to the instruction cache miss address, creating a new search tracker entry comprising the instruction cache miss address and setting the instruction cache miss validity indicator to valid; and based on failing to locate the valid search tracker entry comprising the instruction cache miss address and locating the valid search tracker entry having the valid branch target buffer miss address corresponding to the instruction cache miss address and the instruction cache miss validity indicator of invalid, writing the instruction cache miss address to the valid search tracker entry and setting the instruction cache miss validity indicator to valid.

10. The computer-implemented method of claim 6, further comprising:

making a search tracker entry that is active for a branch target buffer miss but not active for an instruction cache miss available to be overwritten as a new search tracker based on one or more of: an elapsed time and completion of a to-be-initiated search of the second-level branch target buffer.

11. A computer program product for second-level branch target buffer bulk transfer filtering, the computer program product comprising:

a non-transitory storage medium readable by a processing circuit and storing instructions for execution by the processing circuit for performing a method comprising:

receiving branch target buffer miss indicators that are each set based on sequentially searching a plurality of entries across a plurality of rows of a first-level branch target buffer for a predetermined amount of address space without locating a matching entry, wherein the first-level branch target buffer comprises multiple rows and multiple set associative entries per row and a second-level branch target buffer comprises multiple rows and multiple set associative entries per row;

receiving instruction cache miss indicators;

recording information about the branch target buffer miss indicators and the instruction cache miss indicators in search trackers that filter searching of the second-level branch target buffer and control bulk transfers from the second-level branch target buffer to the first-level branch target buffer, the search trackers each comprising a miss validity indicator column, an instruction cache miss validity indicator column, an instruction cache miss address column, and a first-level branch target buffer miss address column to store a starting instruction address that was being searched in a first-level branch target buffer that led to a branch target buffer miss;

based on detecting, by the processing circuit, a search tracker representing a correlated pair of the branch target buffer miss indicators and the instruction cache miss indicators, activating, by the processing circuit, the search tracker to perform a bulk transfer from a second-level branch target buffer to the first-level branch target buffer;

performing the bulk transfer of all entries in the second-level branch target buffer at a same page address as a starting search address associated with the branch target buffer miss of the first-level branch target buffer based on triggering by the search tracker, wherein the bulk transfer from second-level branch target buffer to the first-level branch target buffer is only triggered for an instance of the branch target buffer miss of the first-level branch target buffer that also has a corresponding instruction cache miss at the same page address as the starting search address associated with the branch target buffer miss of the first-level branch target buffer;

based on failing to detect, by the processing circuit, an instruction cache miss indicator correlating to a branch target buffer miss indicator in a search tracker having a branch target buffer miss validity indicator set to valid, performing one of: no searching of the second-level branch target buffer, and a partial search of the second-level branch target buffer covering a smaller address space than an address space covered by the bulk transfer;

updating a recently completed second-level branch target buffer search queue based on completing a secondary search of the second-level branch target buffer;

reading the recently completed second-level branch target buffer search queue; and preventing creation of a new search tracker entry based on identifying a matching recently completed second-level search in the recently completed second-level branch target buffer search queue.

12. The computer program product of claim 11, wherein the method further comprises:

checking the search trackers to determine whether a valid search tracker entry exists for a branch target buffer miss address corresponding to a search request;

determining whether a valid instruction cache miss address corresponding to the branch target buffer miss address exists in a valid search tracker entry having a branch target buffer miss validity indicator of invalid;

based on failing to locate the valid search tracker entry comprising the branch target buffer miss address and failing to locate the valid instruction cache miss address corresponding to the branch target buffer miss address, creating a new search tracker entry comprising the branch target buffer miss address and setting the branch target buffer miss validity indicator to valid; and based on failing to locate the valid search tracker entry comprising the branch target buffer miss address and locating the valid search tracker entry having the valid instruction cache miss address corresponding to the branch target buffer miss address and the branch target buffer miss validity indicator of invalid, writing the branch target buffer miss address to the valid search tracker entry and setting the branch target buffer miss validity indicator to valid.

13. The computer program product of claim 11, wherein the method further comprises:

checking the search trackers to determine whether a valid search tracker entry exists for an instruction cache miss address corresponding to one of the instruction cache miss indicators;

determining whether a valid branch target buffer miss address corresponding to the instruction cache miss address exists in a valid search tracker entry having an instruction cache miss validity indicator of invalid;

based on failing to locate the valid search tracker entry comprising the instruction cache miss address and failing to locate the valid branch target buffer miss address corresponding to the instruction cache miss address, creating a new search tracker entry comprising the instruction cache miss address and setting the instruction cache miss validity indicator to valid; and based on failing to locate the valid search tracker entry comprising the instruction cache miss address and locating the valid search tracker entry having the valid branch target buffer miss address corresponding to the instruction cache miss address and the instruction cache miss validity indicator of invalid, writing the instruction cache miss address to the valid search tracker entry and setting the instruction cache miss validity indicator to valid.

14. The computer program product of claim 11, wherein the method further comprises:

making a search tracker entry that is active for a branch target buffer miss but not active for an instruction cache miss available to be overwritten as a new search tracker based on one or more of: an elapsed time and completion of a to-be-initiated search of the second-level branch target buffer.

\* \* \* \* \*